United States Patent
Ohmori et al.

(10) Patent No.: US 6,903,722 B2
(45) Date of Patent: Jun. 7, 2005

(54) COMPUTER SYSTEM HAVING A PLURALITY OF INPUT DEVICES AND ASSOCIATED DOUBLE-CLICK PARAMETERS

(75) Inventors: Yuhko Ohmori, Sagamihara (JP); Takashi Inui, Yokohoma (JP)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 10/077,532

(22) Filed: Feb. 15, 2002

(65) Prior Publication Data

US 2002/0130836 A1 Sep. 19, 2002

(30) Foreign Application Priority Data

Feb. 15, 2001 (JP) .................................... 2001-039151

(51) Int. Cl.$^7$ ................................................ G09G 5/00
(52) U.S. Cl. .................... 345/156; 345/173; 345/179; 710/73; 715/700; 715/812; 715/821; 715/860
(58) Field of Search ............................. 345/156, 162, 345/167, 168, 173, 179, 700, 711, 821, 812, 860; 710/62, 63, 67, 72, 73

(56) References Cited

U.S. PATENT DOCUMENTS

| | | | | |
|---|---|---|---|---|
| 5,559,943 A | * | 9/1996 | Cyr et al. | 345/856 |
| 6,061,051 A | * | 5/2000 | Chan et al. | 345/173 |
| 6,262,719 B1 | * | 7/2001 | Bi et al. | 345/179 |
| 6,424,338 B1 | * | 7/2002 | Anderson | 345/173 |
| 6,452,617 B1 | * | 9/2002 | Bates et al. | 345/856 |
| 6,643,721 B1 | * | 11/2003 | Sun | 710/62 |
| 2002/0080123 A1 | * | 6/2002 | Kennedy et al. | 345/173 |
| 2003/0051209 A1 | * | 3/2003 | Androski et al. | 715/503 |

* cited by examiner

*Primary Examiner*—Henry N. Tran
(74) *Attorney, Agent, or Firm*—Martin J. McKinley; Dillon & Yudell LLP

(57) ABSTRACT

A computer system has a plurality of input pointing devices, such as a mouse, a track ball, a pointing stick, a tablet or a touch screen. Each of the plurality of input devices connected to the computer system has different parameters associated with a double-click operation, which different parameters are stored in separate registers under control of the operating system. Separate device drivers are associated with each input device, each device driver using the associated double-click parameters as stored by the operating system.

6 Claims, 6 Drawing Sheets

[Figure 1]
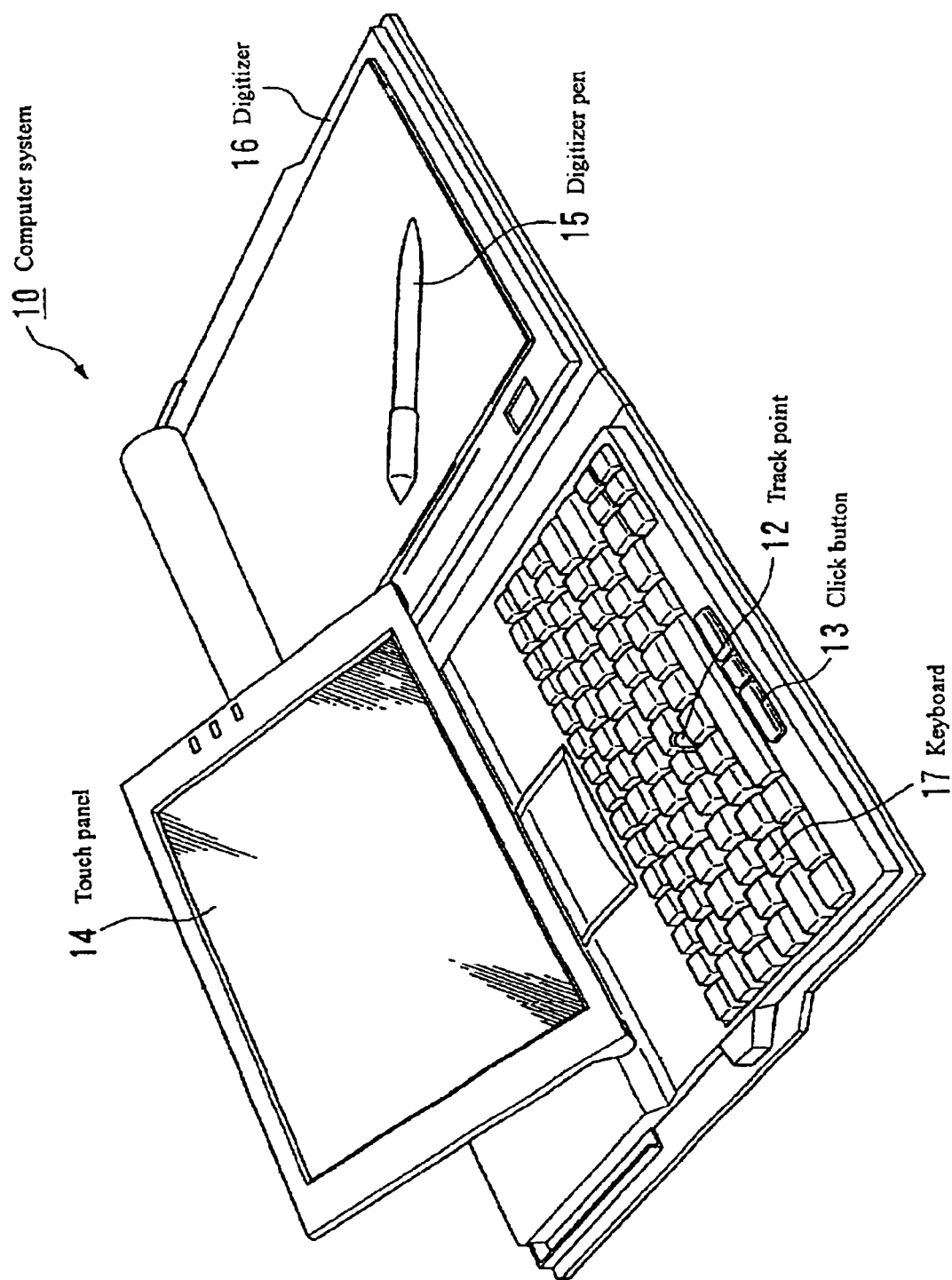

[Figure 2]
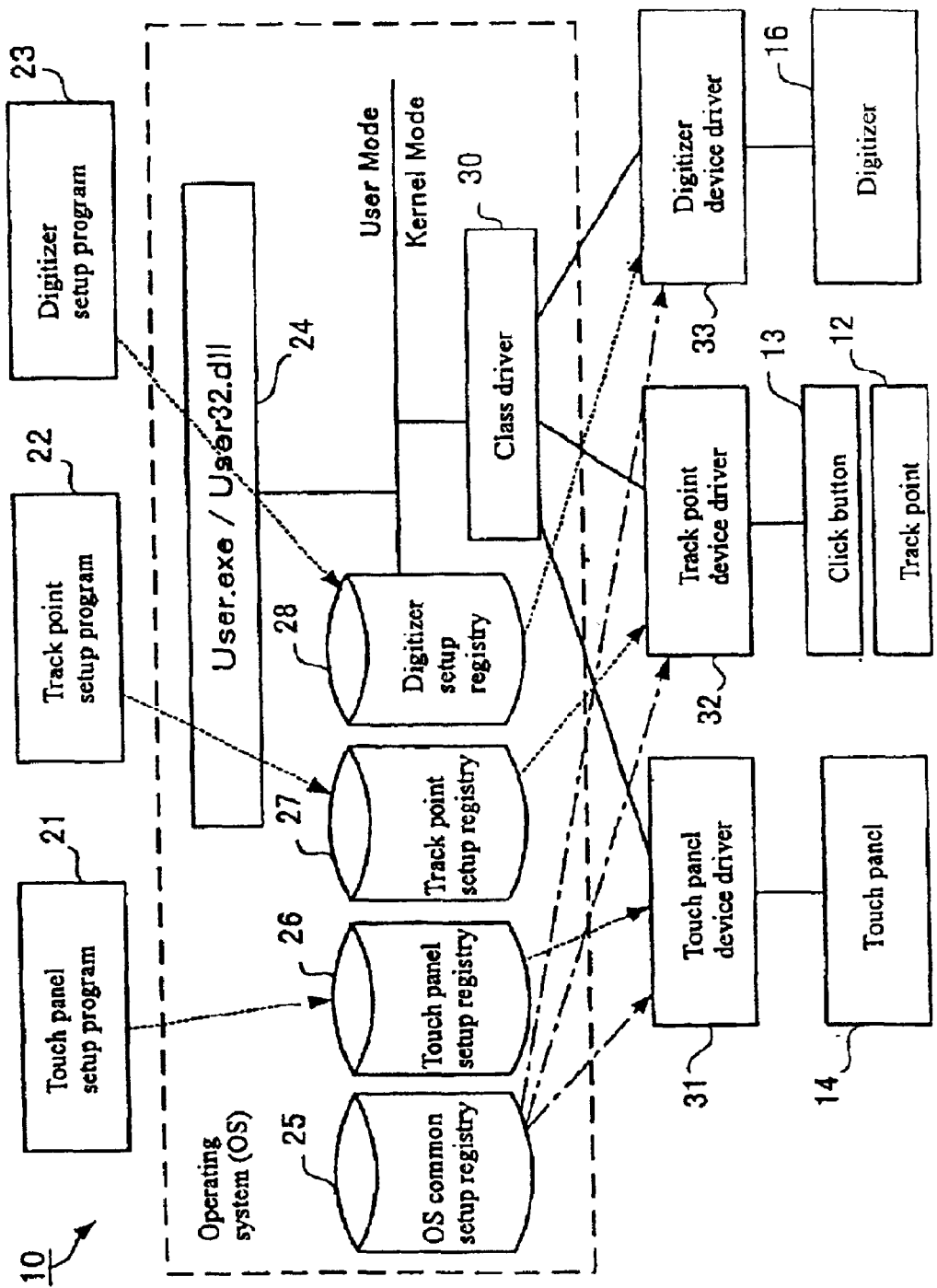

[Figure 3]

| Input device | Double-click recognition area default | Double-click recognition time default | Method of changing by user |
|---|---|---|---|
| OS (Operating System) | 4 dots × 4 dots | 500msec | Change from OS setup screen |
| Touch panel | 64 dots × 64 dots | 900msec | Change from touch panel setup program |
| Track point | 4 dots × 4 dots | 500msec | Change from track point setup program |
| Digitizer | 9 dots × 9 dots | 700msec | Change from digitizer setup program |

51 → (Double-click recognition area default)
52 → (Double-click recognition time default)
53 → (Method of changing by user)

[Figure 4]
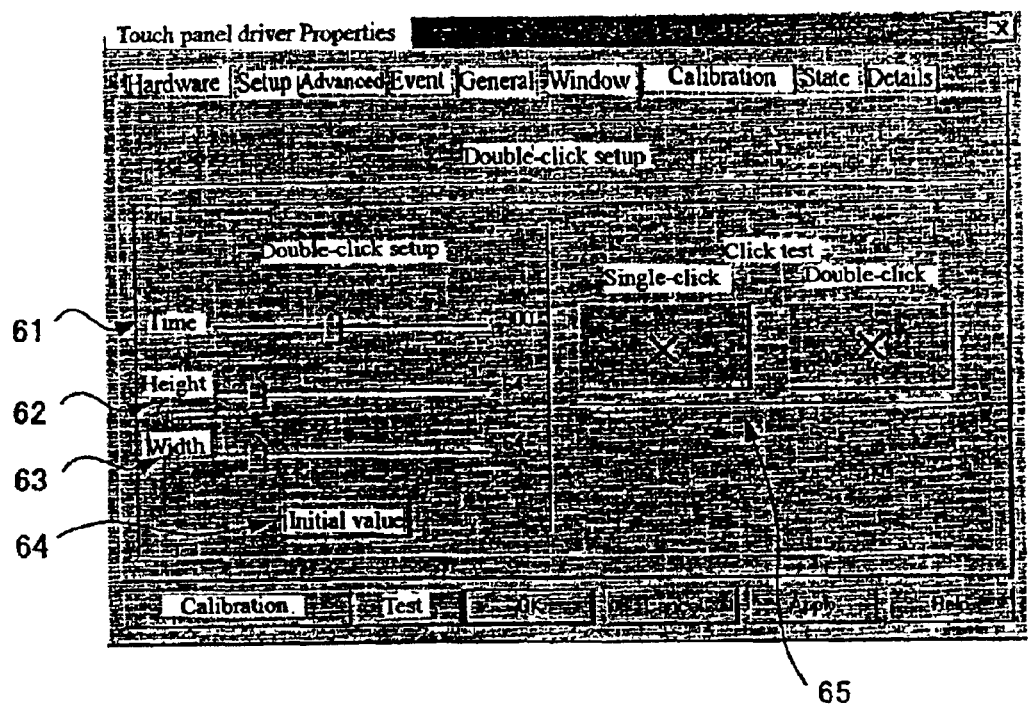

[Figure 5]
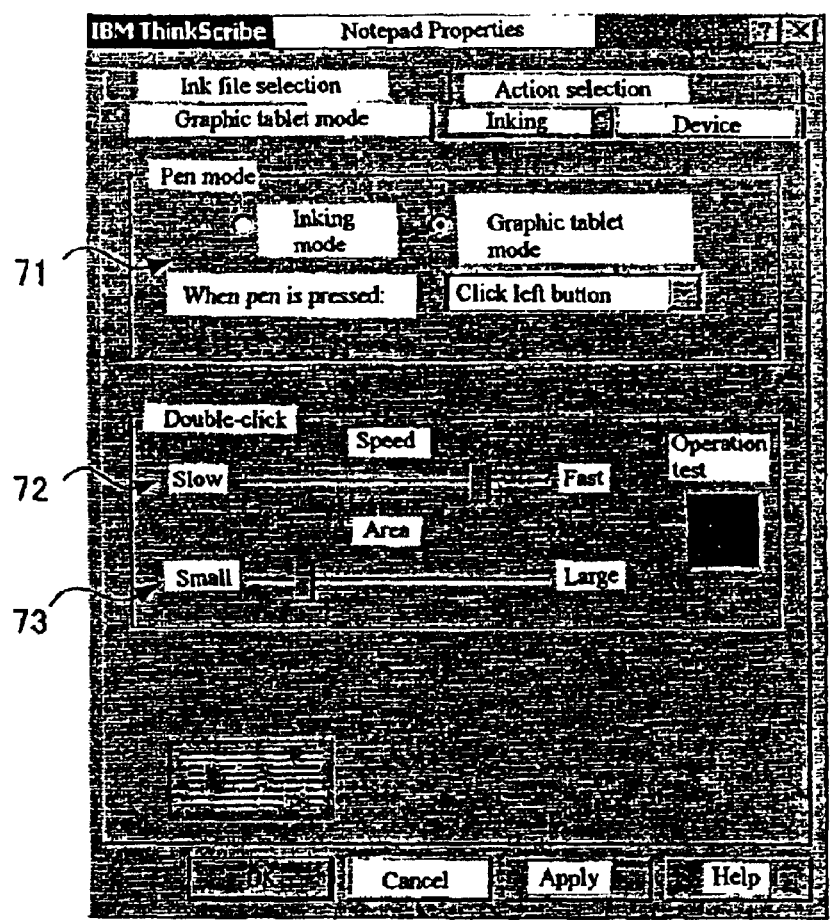

[Figure 6]
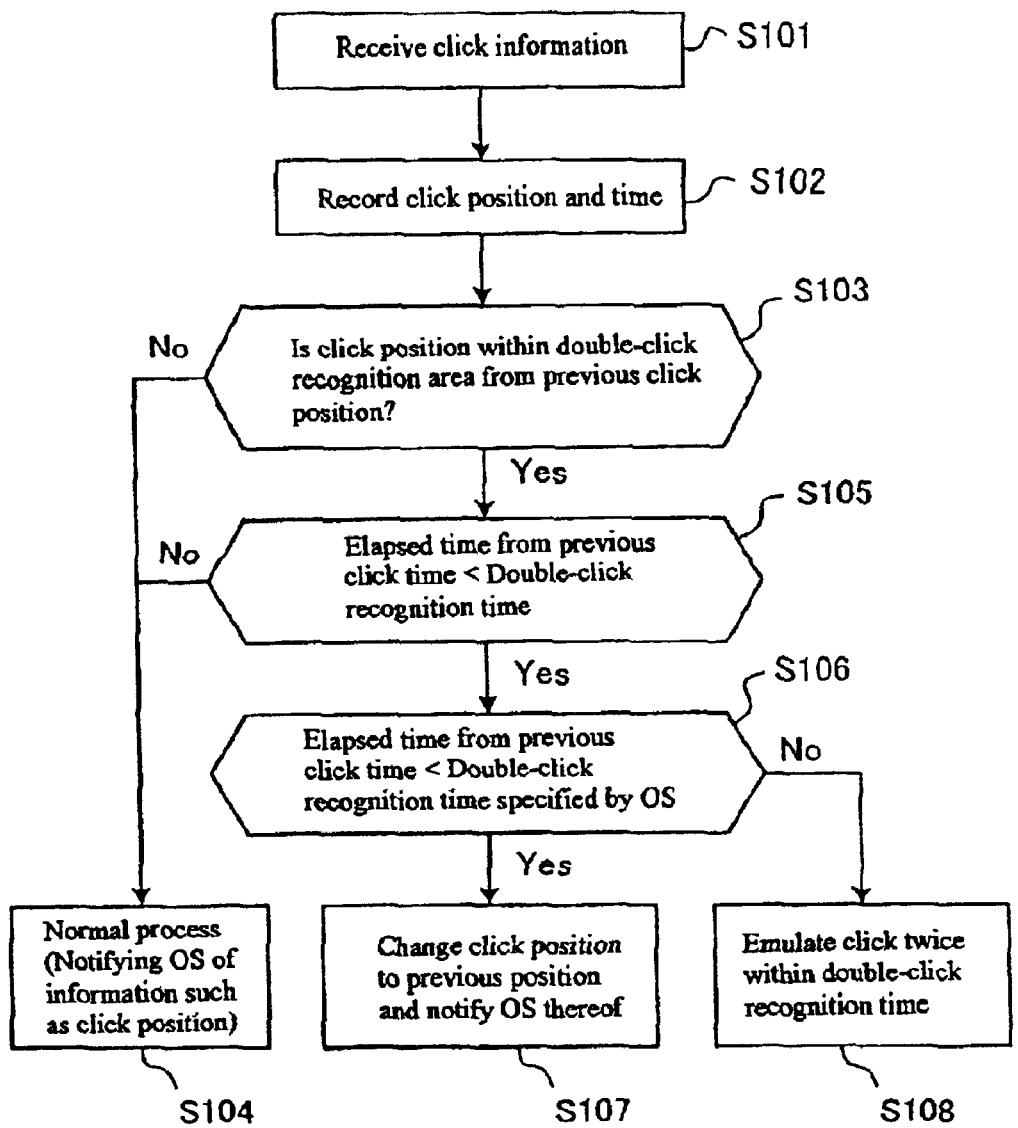

COMPUTER SYSTEM HAVING A PLURALITY OF INPUT DEVICES AND ASSOCIATED DOUBLE-CLICK PARAMETERS

BACKGROUND OF THE INVENTION

Applicants claim the benefits under 35 U.S.C. 119 of Japanese Patent Application 2001-039151, which was filed Feb. 15, 2001. This Japanese Patent Application and its translation are incorporated by reference into this Application.

This invention pertains to computers and other information processing systems and, more particularly, to a computer system having an input device capable of having a plurality of input devices and inputting click information.

Numerous "input pointing devices" or "coordinate input devices" have been developed to input position or coordinate data into a personal computer (PC). These input pointing devices include such well know devices as the mouse, the stick type pointing device commonly used with notebook PC's, the track ball wherein the user physically rotates a ball to indicate a change in position, the track pad wherein input coordinate data is a function of the location of a user's finger on the pad, the tablet or digitizer that detects the position of a pen on the surface of the tablet or digitizer, and the touch panel that inputs data based on the location that a user's finger touches a display screen.

An operation called a "double-click" is typically performed by pointing the input device to a selected coordinate and then pushing a switch associated with the input device twice during a short interval of time. This double click operation is frequently used to start an application or to open a predetermined file.

In the case of a double-click operation on a tablet, a deviation in coordinate data is apt to occur between a first click and a second click. Therefore, Published Unexamined Japanese Patent Application No. 5-158608 describes technology that recognizes a double-click when there is a deviation, within a predetermined range, in coordinate information between two clicks. In addition, Published Unexamined Japanese Patent Application No. 10-143319 discloses a technology to detect a double-click operation when the first and second coordinate positions are in the same data input area and within a predetermined time period, and a double-click operation by a double touch using the forefinger and the middle finger.

Thus, different types of input devices have been used in recent years, and improvements have been made as to double-click recognition for individual input devices, and no prior improvement has been made for a computer system equipped with a plurality of input devices.

Conventionally, double-click recognition area (the coordinate area within which the first and second clicks occur) and double-click recognition time intervals (i.e., the time interval between the two clicks) are kept by an operating system (OS) in a registry with common settings for every input device, such that each and every input device uses the same settings. In the case where a plurality of input devices are connected to the same computer and the settings of the recognition area and recognition time interval are changed for one input device, other input devices will also operate according to these common settings. In general, when compared to a double-click operation with a mouse or a track ball, a double-click operation of a pen on a tablet often results in significant coordinate deviation between the first and second clicks, and the click intervals are typically longer. In addition, a double-click operation of a touch panel usually results in still greater coordinate deviation between the two clicks, and the typical click time interval is even longer. Consequently, in the case where the double-click recognition area and double-click recognition time interval are set by the OS for a predetermined device, a problem occurs when other input pointing devices are used having different recognition area and time interval requirements for a double-click operation.

As one solution to such a problem, the recognition area and recognition time interval can be set to an intermediate level for a plurality of input devices. However, use of intermediate settings will not result in the best operation of each of the input devices. In particular, a malfunction may occur to all the input devices in the case where the characteristics of the plurality of input devices are significantly different.

Accordingly, an object of the present invention is to have improved double-click recognition in a computer system having a plurality of input devices. Another object of the present invention is to make it unnecessary for the operating system to recognize different types of the input devices, and to cause the operating system to correctly recognize a double-click operation performed by each of the input devices.

SUMMARY OF THE INVENTION

Under these objects, the present invention is characterized by setting recognition area and recognition time that can be recognized as a double-click for each individual input device, and in the case of being determined as a double-click by a device driver connected to each individual input device, generating a double-click state using the recognition area and recognition time to be recognized by an operating system (OS) so as to cause the OS to recognize that the double-click has occurred. To be more specific, the present invention is a computer system having a plurality of input devices for a computer, characterized by having input device recognition information keeping means for keeping recognition information, as a unique value to each individual input device, which is recognizable as a double-click, double-click determining means for determining consecutive clicks performed by using the input device to be a double-click based on the kept recognition information, and information notifying means for, in the case of being determined to be a double-click, notifying the OS of the information that is recognizable by the OS as a double-click.

Here, as the recognition information kept by the input device recognition information keeping means is characterized by being the double-click recognition area and double-click recognition time that are set up for each individual input device, it is desirable in that double-click information can be kept according to characteristics of the input devices such as a device that may be significantly deviated from its position by clicking twice or a device requiring predetermined time for clicking twice. Moreover, it is possible to keep a plurality of recognition information by one input device such as input of a finger and a pen.

In addition, as the information notified by the information notifying means is characterized by being location information on a click position inputted by the input device changed to a location to be recognized by the operating system as well as double-click information formed by time intervals to be recognized as a double-click by the OS, it is superior in that it is not necessary to change set values in the OS for each individual input device and even in the case of having a plurality of input devices, a double-click can be recognized almost correctly from each individual input device.

If seen from another viewpoint, the computer system to which the present invention is applied has an OS for performing input-output control of the computer, a device driver provided to each of the input devices for mediating between the input device and the OS, and a registry for keeping for the each of input devices recognition information to be recognized as a double-click apart from the double-click recognition information set up for the OS, and the device driver is characterized by recognizing consecutive click operations performed by the input device as a double-click based on the recognition information kept by the registry and emulating an operation to be recognized as a double-click by the OS.

If seen from another viewpoint, the computer system to which the present invention is applied is characterized by having setup screen providing means for providing a setup screen to set up double-click recognition time and recognition area dedicated to the input devices apart from information applied in common to the input devices to be connected or apart from the double-click recognition information set up for the OS, and storing means for storing for each of the input devices information on the recognition time and recognition area set up by a user based on the setup screen provided by the setup screen providing means.

Here, it is desirable, in point of allowing an appropriately setup according to characteristics of each of the input devices, that the setup screen providing means is characterized by providing the setup screen so as to allow the double-click recognition time and recognition area to be set up with reference to a default provided for each of the input devices.

On the other hand, the present invention is an input system including an input device for specifying a position on a display screen of a computer and a device driver for managing the input device, characterized by including click operation recognizing means for recognizing a click operation by a user, double-click determining means for determining a double-click performed by the input device based on first click information recognized and second click information recognized thereafter, and double-click information outputting means for, in the case where it is determined that a double-click is performed, converting it into information to be recognized as a double-click by the computer and outputting it.

In addition, in the input system to which the present invention is applied, the input device is characterized by notifying the device driver of click information responding to a click operation of the user, and the device driver determines whether it is a double-click or not as determination unique to the input device from a plurality of click information notified by the input device, and if determined to be a double-click, emulates the click operation so as to be determined to be a double-click by the OS.

On the other hand, the present invention can be grasped as a device managing program for functioning to a computer as double-click determining means for, based on first click information inputted from an input device and second click information inputted thereafter, determining whether a double-click is performed by the input device, and click information generating means for, in the case where it is determined that a double-click is performed, generating click information to be recognized as a double-click by the OS.

Here, the click information generating means is characterized by determining whether elapsed time between the first click information and the second click information is within double-click recognition time specified by the OS, and if so, generating the click information by changing a click position of the second click information to a click position of the first click information. In this way, it is superior for instance in that, even in the case where the input device recognizes a double-click in a range wider than recognized by the OS, it can cause the OS to recognize a double-click correctly. In addition, it can also be characterized by, in the case where the elapsed time between the first click information and the second click information is longer than the double-click recognition time specified by the OS, emulating a click twice within the double-click recognition time.

Furthermore, the present invention is a device setup program for setting up an input device to be connected to a computer, characterized by causing the computer to implement a function of displaying a setup screen for setting up double-click recognition time and recognition area dedicated to the input device apart from information set up by the OS, and a function of storing information on the recognition time and recognition area set up based on the displayed setup screen as double-click information unique to the input device.

In addition, the present invention is a double-click conveying method for causing the OS to recognize double-clicks performed by a plurality of input devices provided to the computer respectively, characterized by receiving the first click information and the second click information from the input device, determining whether or not the received click information fits into a double-click performed by the input device, and in the case of being determined to be the double-click, determining whether the elapsed time acquired from the first click information and the second click information is within double-click recognition time specified by the OS, and in the case where the elapsed time is out of the double-click recognition time, emulating a click twice within the double-click recognition time.

On the other hand, in a storage medium storing a program to be executed by the computer in a manner readable by the computer, the program can be characterized by causing the computer to execute a process of determining whether or not consecutive click information received from the input device connected to the computer is a double-click based on a condition unique to the input device, and a process of, in the case of being determined to be a double-click, generating information to be recognized as a double-click by the OS.

Furthermore, the program stored by the storage medium can be characterized by causing the computer to execute a process of displaying a setup screen for setting up double-click recognition time and recognition area dedicated to the input device apart from information set up by the OS and a process of storing information on the recognition time and recognition area set up based on the displayed setup screen as double-click information unique to the input device.

BRIEF DESCRIPTION OF THE DRAWINGS

FIG. 1 is a perspective view of a computer system having a touch panel, a digitizer and digitizer pen.

FIG. 2 is a block diagram of the input device configuration process of the current invention;

FIG. 3 is a table illustrating the relationship between various input devices and their respective parameters for double-click recognition;

FIG. 4 is a diagram of an example of a touch panel setup screen provided by a touch panel setup program 21;

FIG. 5 is a diagram showing an example of a digitizer setup screen provided by a digitizer setup program 23; and FIG. 6 is a flow chart describing the operation in each of device drivers 31 to 33.

DESCRIPTION OF THE PREFERRED EMBODIMENTS

The present invention will be described in detail hereafter based on embodiments shown in attached drawings.

FIG. 1 is a diagram for describing general configuration of a computer system of this embodiment. A computer system 10 to which this embodiment is applied has a plurality of input devices capable of specifying positions and attributes and inputting coordinates. As a first input device, it has a pointing stick 12 that is a movable stick jutting at the center of a keyboard 17, and a click button 13 for receiving a click of a position specified by the pointing stick 12. In addition, as a second input device, it has a touch panel 14 providing a pressure-sensitive or optical sensor on the entire surface of the display for receiving input by a user's finger or a pen. Furthermore, as a third input device, it has a digitizer pen 15 having a nib for recording in a predetermined color and thickness on paper and a built-in coil near the nib to radiate an electromagnetic wave and a digitizer 16 for recognizing a trail of the digitizer pen 15 at a resolution of plus or minus 0.1 mm or so and a click state by the pressed nib. This computer system 10 is capable of recognizing click operations inputted from these three types of input devices and also recognizing a double-click performed by each of the input devices.

FIG. 2 is a block diagram for describing configuration related to input device processes of the computer system 10. The computer system 10 of this embodiment has, as application programs, which enables the setup of each input device, a touch panel setup program 21, a pointing stick setup program 22 and a digitizer setup program 23, and they allow the user to set up double-click recognition information, for instance, based on a setup screen mentioned later. An operating system (OS) has a software module 24 that is User.exe/User32.dll as a user mode. This software module 24 is a module for communicating with an application through messaging of Windows (Microsoft Corp., USA) that is an OS, for instance. In addition, the OS has a class driver 30 as a kernel mode. Furthermore, it has a registry for storing information set up by each application program and OS common settings.

Recognition area values and recognition time values set up by the touch panel setup program 21, the pointing stick setup program 22 and the digitizer setup program 23 that are the application programs are stored in a touch panel setup registry 26, a pointing stick setup registry 27 and a digitizer setup registry 28 respectively. To be more specific, this embodiment is characterized by allowing a setup dedicated to each individual input device to be stored in a dedicated storage area. In addition, common set values to the input devices that the OS has are stored in an OS common setup registry 25. To be more specific, reference values of information to be recognized as a double-click by the OS are stored in this OS common registry 25, and the drivers (31 to 33) mentioned later perform emulation based on information stored therein. Moreover, the recognition area values and recognition time values for the input devices can be stored in places other than the above-mentioned registries. For instance, there is no problem if it is a storage area capable of reading and writing predetermined files and so on and not erasable by turning on and off the power.

The class driver 30 that is a driver provided by the OS is a program for mediating between and managing the OS and peripherals. As a separate module for this class driver 30, device drivers that can be incorporated into the input devices are connected. To be more specific, the input device not supported by the OS as a standard becomes usable by installing an applicable driver. Here, it has a touch panel device driver 31 for controlling the touch panel 14 and allowing input therefrom, a pointing stick device driver 32 for receiving input from the pointing stick 12 and the click button 13, and a digitizer device driver 33 for processing and controlling input from the digitizer 16. In this embodiment, the device drivers (31 to 33) receive click information from the respective hardware and then determine whether or not it is a double-click based on set values stored in the registries (26 to 28) so as to generate a signal to be recognized as a double-click by the OS and output the generated signal to the class driver 30.

FIG. 3 is a diagram showing relationship between the input devices and the values for recognizing a double-click. Here, a double-click recognition area default 51 and a double-click recognition time default 52 are indicated for the common part as the OS, and the touch panel 14, the pointing stick (click button 13 and pointing stick 12) and the digitizer 16 as the input devices respectively. For instance, the double-click recognition area default 51 of the OS is set at 4 dots×4 dots and the double-click recognition time default 52 is set at 500 ms, and the set values for the pointing stick (click button 13 and pointing stick 12) are also the same values. In addition, as for the touch panel 14, the double-click recognition area default 51 is set widely at 64 dots×64 dots and the double-click recognition time default 52 is set long at 900 ms, for instance, considering input by fingers. Likewise, defaults for the digitizer 16 are set a little more widely (9 dots×9 dots) and longer (700 ms) than the OS defaults considering operation by the digitizer pen 15.

Moreover, FIG. 3 shows a method of changing the recognition area and the recognition time by the user (method of changing by the user 53). For instance, in the case of changing a size of recognition area and/or recognition time for recognizing the double-click as to the OS, a change should be made from the OS setup screen. Common double-click information changed from the OS setup screen is stored in the OS common setup registry 25. In addition, as for the input devices, changes should be made by the application programs (21 to 23). For instance, as for the touch panel 14, the setup screen can be displayed on a display by the touch panel setup program 21 so as to configure it to receive changes made by the user. Likewise, changes can be made from the pointing stick setup program 22 for the pointing stick (click button 13 and pointing stick 12), and from the digitizer setup program 23 for the digitizer 16. Information on such changed recognition area and recognition time is stored in the respective registries (26 to 28).

FIG. 4 is a diagram showing an example of the touch panel setup screen provided by the touch panel setup program 21. Here, the touch panel 14 is taken as an example of the setup shown in FIG. 3. The setup screen shown in FIG. 4 allows a recognition time setting part 61 and a vertical (height) direction 62 and cross direction 63 as recognition area to be set. The respective units are "msec" for the recognition time setting part 61 and "dot" for the vertical direction 62 and the cross direction 63. In addition, pressing an initial value button 64 can return them to the defaults (900 ms, 64 dots×64 dots) shown in FIG. 3. Furthermore, in a click test 65, single-click (clicking once) and double-click operations can be checked by change on the screen for instance. The values set here are stored in the touch panel setup registry 26.

FIG. 5 is a diagram showing an example of a digitizer setup screen provided by the digitizer setup program 23. On the setup screen shown in FIG. 5, a pen mode 71 is set up first. In setting up this pen mode 71, either an inking mode for using the digitizer pen 15 for drawing a picture on the digitizer 16 rather than using it like a mouse or a graphic tablet mode for using it for click operations like a mouse can be selected. When using it for a double-click, the graphic tablet mode is selected as shown in FIG. 5. In addition, as for setup of a double-click, double-click recognition speed 72 and area 73 can be set up (in an analog manner) from fast to slow and from large to small based on the user's sense. The sensory values set up here are converted into the number of dots and time respectively to be stored in a digitizer setup registry 28.

FIG. 6 is a diagram for describing an operation flow in each of the device drivers (31 to 33). Each of the device drivers (31 to 33) receives click information from the input device under its control (step 101). And it records the received click position and time in predetermined memory of the device drivers (31 to 33) (step 102). Subsequently, it recognizes a click operation performed next and then it is determined whether the click position is within the double-click recognition area from the previous click position recorded in the memory (step 103). To be more specific, in the case of the touch panel device driver 31 for instance, it is determined whether it is within the double-click recognition area by comparing it with the recognition area stored in the touch panel setup registry 26. And in the case of the pointing stick device driver 32, it is compared with the recognition area stored in a pointing stick setup registry 27, and in the case of the digitizer device driver 33, it is compared with a digitizer setup registry 28. In the case where it exceeds the double-click recognition area by such comparison, a normal process is executed by notifying the OS of information such as the click position (step 104).

In the case where it is within the recognition area in step 103, it is determined whether the elapsed time from the previous click time is shorter than the double-click recognition time (step 105). To be more specific, as in step 105, each of the device drivers (31 to 33) determines whether the two performed clicks can be called a double-click for the respective input devices compared with the set up double-click recognition time stored in the each of the registries (26 to 28) dedicated to the respective input devices. In the case where the elapsed time is longer than the double-click recognition time, the normal process of step 104 is executed.

In step 105, in the case where the elapsed time is shorter than the double-click recognition time, it is determined whether the elapsed time from the previous click time is shorter than the double-click recognition time specified by the OS (step 106). To be more specific, it is compared with the common setup time of the OS stored in the OS common setup registry 25. As a result of comparison, in the case where the elapsed time is short, it changes the click position to the previous position and notifies the OS thereof (step 107). On the other hand, in the case where the elapsed time is longer, it artificially notifies the OS of click information of two clicks as to the recognized position within the time to be recognized as a double-click by the OS (step 108).

Thus, this embodiment allows the double-click recognition area and the double-click recognition time to be set up for each individual input device so that a setup dedicated to each individual input device is stored in a dedicated storage area. In addition, when each individual device driver receives click information (first click information) from the hardware (the respective devices), it records the time and position of receipt so as to compare the previous time and position with current time and position in the case of receiving click information (second click information) again. As a result of this comparison, in the case where the current position is within the recognition area of which base point is the previous position and time difference is within the set up recognition time, it is determined that a double-click was performed. And it changes the click position to the previous position and reports it to the OS or emulates a click twice at a time interval to be recognized as a double-click by the OS so that the OS recognizes that the double-click has occurred. Therefore, even in the case of having a plurality of input devices, this embodiment allows each individual input device to have a dedicated setup so that it becomes possible to avoid a problem that an action intended as a double-click cannot be recognized as a double-click and an action not intended as a double-click is treated as a double-click.

Moreover, while this embodiment was described based on the computer system 10 having the touch panel 14, the pointing stick 12 and click button 13, and the digitizer 16 as the input devices, it is also applicable likewise to the cases of connecting with other input devices of different hardware configuration such as a mouse, a track ball, track pad or a tablet. In addition, combinations of these can be selected freely.

Furthermore, as an application of this embodiment, it is possible to set different recognition area and recognition time even with the same hardware depending on the method of using them. For instance, it can keep different values in the case where the touch panel 14 is clicked on with a finger and in the case where it is clicked on with a pen, and determine a double-click depending on difference in the click form, that is, whether a finger or a pen by using different set values. As for the recognition of whether a finger or a pen, for instance, it can be configured so that, depending on the range of the touch panel 14 being pressed once, it is determined to be a finger if the range is wide, and a pen if narrow. A double-click can be more correctly recognized by sending an artificial double-click to the OS based on the results of this determination.

Furthermore, as an application of this embodiment, it is also possible, in the case where the same hardware is used by different users, to configure it to set up the recognition area and recognition time for each individual user. For instance, each of the registries (26 to 28) stores the recognition area and recognition time for a double-click for each individual user, and each of the device drivers (31 to 33) recognizes the user using each individual input device so as to determine whether a double-click or not for each individual user. This application allows a further application, for instance, in such a manner as to extend the recognition time for a double-click for a beginner unaccustomed to operations, an elderly person and so on without changing a setup of the OS. In particular, as there are various differences in individual operations as to each individual input device that is provided, application of this embodiment has significant effect.

Moreover, as for forms of applying this embodiment, it can be provided as a device driver for recognizing a double-click or a device setup program for a setup. In addition, there are cases where it is applied in a form in which each individual input device is provided to the computer system in advance.

Furthermore, it is also possible to provide the device drivers as a device managing program or the device setup program shown in the above embodiment in the forms of the following storage media and program transmitting apparatus.

To be more specific, as for storage media, the above programs to be executed by a computer apparatus can be stored in storage media such as a CD-ROM, a DVD, a memory and a hard disk in a manner readable by the computer apparatus. For instance, when selling input devices, it is thinkable to simultaneously provide the device drivers and the device setup program of this embodiment in a CD-ROM so that the user can install them.

In addition, the program transmitting apparatus can be configured to have storing means such as a CD-ROM, a DVD, a memory and a hard disk storing the above program, and transmitting means for reading the program from these storing means and transmitting it to the apparatus for executing the program via a connector and a network such as the Internet or LAN. Such a program transmitting apparatus is especially suitable for installing the program of this embodiment once as a version up program, for instance, on a provided input device.

As described above, it is possible for the present invention, in the case where the computer can have a plurality of input devices, to have a double-click operation by using each of the input devices correctly recognized.

What is claimed is:

1. A method comprising:
    setting up each input device in a data processing system, each input device being from a plurality of input devices, such that each input device has a double-click interval time that is independent of double-click times of other input devices in the plurality of input devices, the double-click interval times being a time interval between clicks in a double-click input event, wherein a double-click input event is performed on a touch panel, and wherein the double-click input event is determined by double-click interval times that are different if the touch panel is double-clicked with a stylus pen or with a finger, and wherein the finger is recognized by having a larger contact area with the touch panel than the stylus pen.

2. The method of claim 1, wherein a time interval between clicks in a double-click is longer for a double-click by the finger than a double-click by the stylus pen.

3. A computer program product, residing on a computer usable medium, the computer program product comprising:
    computer program code for setting up each input device in a data processing system, each input device being from a plurality of input devices, such that each input device has a double-click interval time that is independent of double-click times of other input devices in the plurality of input devices, the double-click interval times being a time interval between clicks in a double-click input event, wherein a double-click input event is performed on a touch panel, and wherein the double-click input event is determined by double-click interval times that are different if the touch panel is double-clicked with a stylus pen or with a finger, and wherein the finger is recognized by having a larger contact area with the touch panel than the stylus pen.

4. The computer program product of claim 3, wherein a time interval between clicks in a double-click is longer for a double-click by the finger than a double click by the stylus pen.

5. A system comprising:
    means for setting up each input device in a data processing system, each input device being from a plurality of input devices, such that each input device has a double-click interval time that is independent of double-dick times of other input devices in the plurality of input devices, the double-click interval times being a time interval between clicks in a double-click input event, wherein a double-click input event is performed on a touch panel, and wherein the double-click input event is determined by double-click interval times that are different if the touch panel is double-clicked with a stylus pen or with a finger, and wherein the finger is recognized by having a larger contact area with the touch panel than the stylus pen.

6. The system of claim 5, wherein a time interval between clicks in a double-click is longer for a double-click by the finger than a double-click by the stylus pen.

* * * * *